Jan. 31, 1939. R. THOMAS 2,145,437
APPARATUS FOR MULTICOLOR PHOTOGRAPHY
Filed Oct. 4, 1937 2 Sheets-Sheet 2
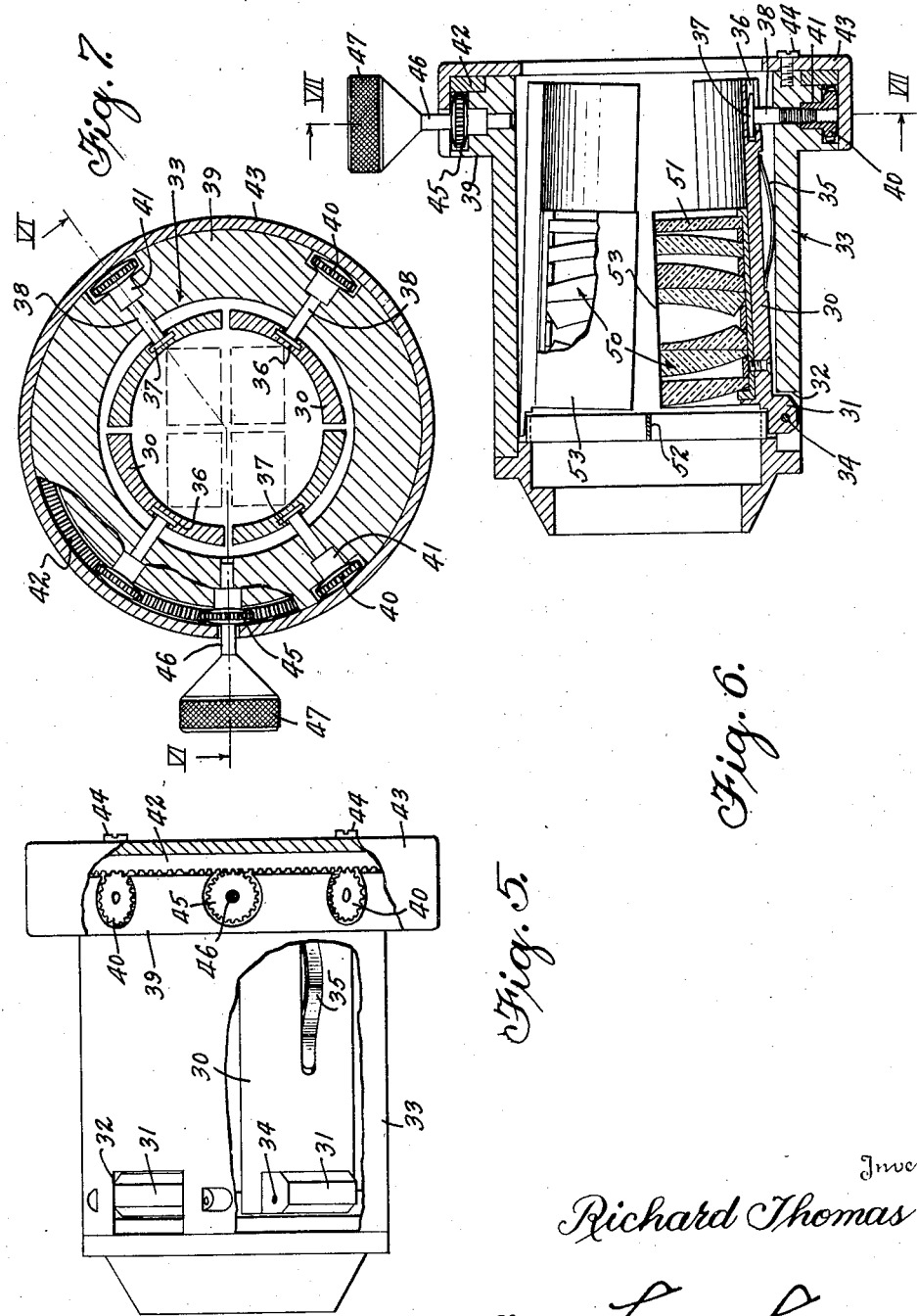
Inventor
Richard Thomas
By Lyon & Lyon
Attorneys Patented Jan. 31, 1939

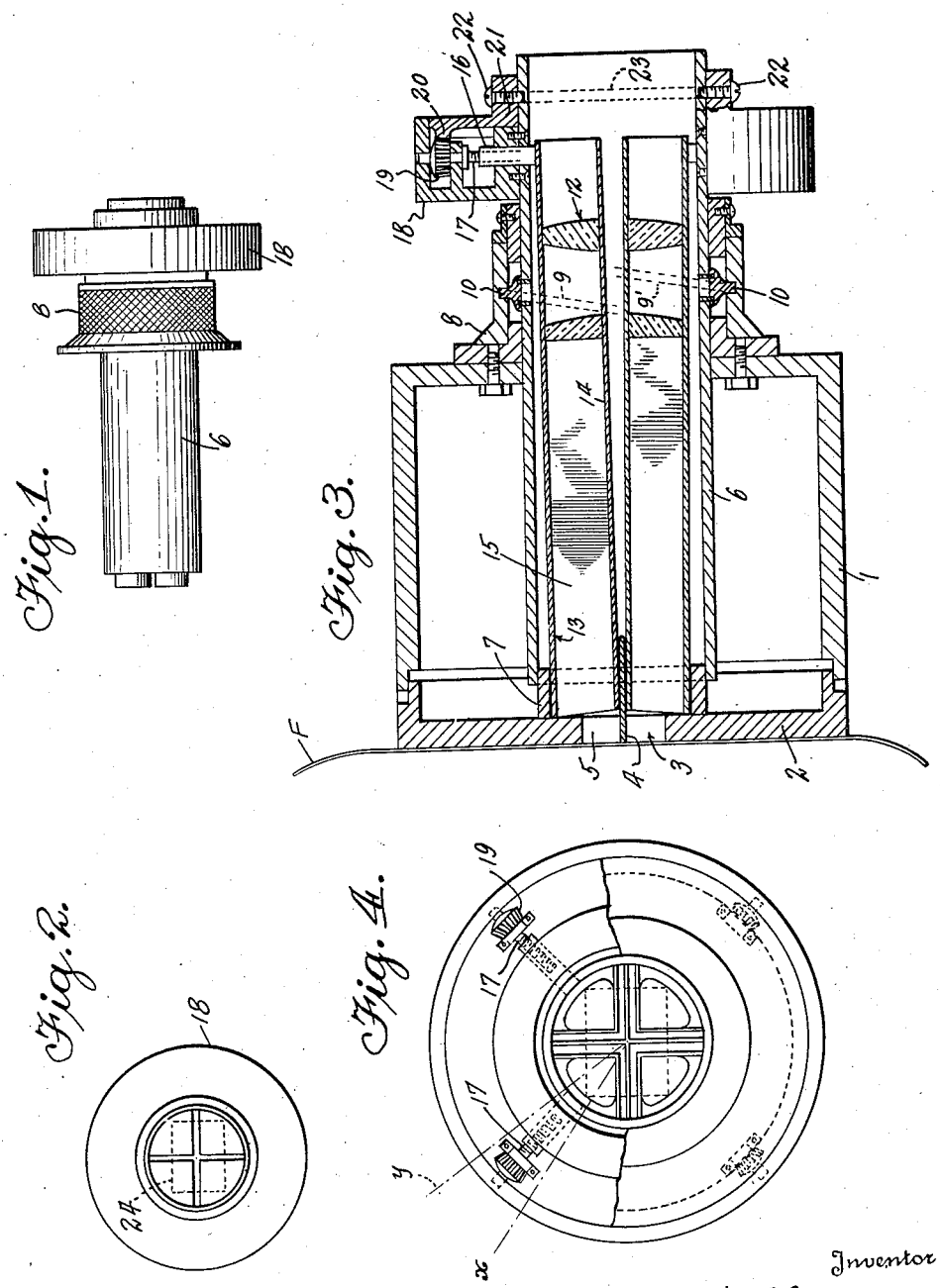

2,145,437

UNITED STATES PATENT OFFICE 2,145,437

APPARATUS FOR MULTICOLOR PHOTOGRAPHY

Richard Thomas, Los Angeles, Calif.

Application October 4, 1937, Serial No. 167,159

5 Claims. (Cl. 88—16.4)

This invention relates to the production of motion pictures in virtually natural color and is concerned with devices whereby a plurality of images differing in color value may be either recorded upon a photographic emulsion or projected simultaneously.

Some difficulty has been experienced in the past in producing a plurality of images of a given scene or object, these images being substantially identical in that specified portions or objects represented in each image bear a definite and constant relation to each other in each series of photographic images recorded at substantially the same time. In other words, some difficulty has been encountered in simultaneously producing a plurality of photographic images of a scene and in making certain that these various photographic images were identical in all respects except color value. A similar difficulty has been encountered in simultaneously projecting two, three or four photographic images differing in color value to the end that the picture on the screen is free from fringe, parallax and misregistration.

The present invention is particularly directed toward means whereby light from a given objective field is divided into bundles of light, each bundle then forming upon a photographic emulsion an image of the entire objective field, the images differing in color value recorded upon the emulsion.

The invention also pertains to means whereby a film bearing a plurality of substantially identical images differing in color value may be simultaneously projected upon a given screen or viewing surface in exact registration. Moreover, the invention is directed toward an apparatus whereby critical adjustments may be readily made and precise superimposition or registration of the various images readily attained.

The present application is a continuation-in-part of a co-pending application Serial No. 2807 filed January 21, 1935, now Patent No. 2,097,706, in which a particular method of color photography has been claimed.

An object of the present invention is to disclose and provide means whereby the production of a plurality of photographic images simultaneously is facilitated.

Another object is to disclose and provide means whereby a plurality of images differing in color value may be simultaneously projected upon a viewing screen in exact superimposition and registration.

These and other objects will be evident to those skilled in the art from the following detailed description in which illustrative forms of the device are disclosed in detail. In the exemplary forms described hereinafter provision has been made whereby four quadrantal lens systems are employed. In modifications of this device and method three or more lens segments or systems may be used.

In describing the illustrative forms reference will be had to the appended drawings, in which:

Fig. 1 is a side elevation showing a lens system unit constructed in accordance with this invention.

Fig. 2 is an end view of the device shown in Fig. 1.

Fig. 3 is an enlarged longitudinal section of a projecting unit of the character shown in Fig. 1.

Fig. 4 is an end view thereof with a portion broken away.

Fig. 5 is a side elevation, partly broken away, of a modified form of unit.

Fig. 6 is a longitudinal section through the device, said section being taken along the lines VI—VI of Fig. 7.

Fig. 7 is a transverse section taken along the plane VII—VII of Fig. 6.

It is to be understood that the illustrative embodiments of this invention shown in the drawings are particularly adapted for use in the projection of a plurality of images simultaneously upon a viewing screen but a similar arrangement can be used during photography.

In Figs. 1 to 4 a portion of a housing of a projector is indicated at 1, this projector being provided with a wall portion 2 having a film opening or aperture 3 therein past which the film F is threaded through a suitable film gate (not shown). This film opening is preferably divided into four similar apertures by means of a horizontal septum 4 and a vertical septum 5. It is to be understood that in this embodiment four images (or three out of a grouping of four as described in said co-pending application) are to be simultaneously projected.

A lens housing 6 in tubular form is slidably mounted within the housing 1 and may be slidably receivable upon a guide sleeve 7, attached to the rear wall 2. The tubular lens housing 6 may be provided with means for moving the same longitudinally, i. e., toward and away from the aperture 3, or said lens housing 6 may be fitted into the usual lens adjusting ring found on standard projection machines. As shown in the drawings, however, the forward portion of the housing 1 is provided with a rotatable adjusting sleeve 8 mounted upon relatively stationary portions of the housing 1. This adjusting sleeve 8 may be provided with cam grooves 9 and 9' adapted to receive pins 10 fixed to the lens housing 6.

Within the lens housing 6 there are mounted four similar quadrantal lens systems 12, each carried in a lens system holder 13 that embodies portions of a horizontal septum 14 and a vertical septum 15. The inner ends of these lens holders 13 are fitted closely together for endwise adjustment in the sleeve 7 but the outer portions thereof are adjustable radially outward and inward by an adjusting means.

This adjusting means includes an internally threaded socket block 16 fixed to each of the lens holders 13 near the outer end thereof. Each socket block is in engagement with a threaded stem 17 journaled to turn in a holder 18 attached to the lens housing 6. Each of the threaded stems 17 has fixed thereto a beveled pinion 19 and all of said pinions are engaged by a ring gear 20 formed on or attached to a flanged plate 21 which is adjustably positionable on the forward end portion of the lens housing 6. In order to adjustably position the flanged plate 21, said plate is provided with screws 22 adapted to engage an annular groove 23 formed in the exterior surface of the lens housing 6. By turning the flanged plate 21 the four quadrantal lens systems 12 mounted in the lens holders 13 are moved inwardly toward a common center or axis, or outwardly so as to facilitate accurate and correct registration of images carried by the film F and projected upon a screen in superimposed relation.

As shown in Fig. 4, the several screws 17 are arranged and set centrally or midway of each quadrant holder. This is the correct setting in the event the film apertures are square but in actual practice these apertures are usually somewhat oblong, as indicated at 24 in Fig. 2 and as indicated by dotted lines in Fig. 4. With such oblong apertures the screws 17 should be mounted to one side of the center of the respective quadrants, i. e., toward the long side of the film aperture and as indicated by the broken line x, such positioning would be for the purpose of increasing proportionately the degree of lateral adjustment relative to the degree of vertical adjustment, it being understood that in order to superimpose three or four rectangular images into a composite picture it is necessary to move the images a greater distance in a lateral direction than in a vertical direction, the center to center spacing of the image areas being greater along the horizontal plane than in the vertical plane.

In the event the film apertures were oblong in the opposite direction, i. e., higher than their width, then the screws 17 should be correspondingly offset in the other direction, as indicated by the broken line y in Fig. 4, the purpose in each case being to effect a symmetrical and proportionate adjustment of the respective lens systems with respect to the center of the entire arrangement of the lens systems.

Attention is called to the fact that by removing the flanged plate 21 it is possible to adjust any one of the lens holders 13 or lens systems 12 by simply imparting a minor degree of rotation to the beveled pinion 19, partial rotation of such beveled pinion resulting in a very minute but positive movement of the socket block 16. After such preliminary setting the flanged plate 21 provided with its ring gear 20 may be engaged with all of the beveled pinions 19 and rotation of the flanged plate will cause simultaneous adjustment of the lens systems toward or away from each other and toward and away from a common axis.

In the modified form of device shown in Figs. 5 to 7, each quadrantal lens holder 30 is provided with a hinge block 31 adapted to fit into a slot 32 formed in the lens housing 33, a suitable pin being passed through a portion of the lens housing 33 and through a hole 34 made in the hinge block 31. Preferably the hinge block is in the rear or near the aperture end of the lens housing 33. Moreover, said hinge blocks 31 are not centrally positioned on each of the lens holders 30 but are instead toward one side only of the longitudinal center line of each lens holder 30.

The various lens holders 30 are yieldably urged toward one another by means of spring elements 35 retained within suitable slots formed in the outer surface of each lens holder 30. Each lens holder is furthermore provided with a T-shaped slot or keyway 36 adapted to slidably receive a shoe 37 carried by the lower end of an exteriorly threaded shaft 38. It is to be understood that the shoes 37 are preferably oblong or rectangular in shape in order to prevent them from rotating within the slot 36.

The lens holder 33 is provided with an outwardly extending flange 39 provided with bores adapted to receive pinions 40 provided with a shank 41 rotatable within a suitable radial bore made in the flange 39. These pinions 40 and shanks 41 are internally threaded and are in engagement with the stems 38. A ring gear 42 is rotatably held in engagement with the pinions 40 and retained in such engagement by means of a covering sleeve 43 removably fastened to the lens housing 33 by screws 44.

The axes of the stems 38 preferably coincide with the diagonals of the image areas being projected as shown in Fig. 7. At some point along the periphery of the flange 39 a pinion 45 is carried upon a shaft 46, said shaft being provided with an operating handle or knob 47, the pinion 45 being also in engagement with the ring gear 42. By operating the knob 47, the ring gear 42 is caused to rotate within its runway and since said ring gear is in engagement with the pinions 40, the various lens mounts 30 are moved toward and away from each other in a predetermined and uniform manner, the springs 35 maintaining a constant tension on the stems 38 and shoes 37 slidably engaged with the slots 36.

Again, in the event it is desired to adjust one or two of the lens holders 30 individually, the covering sleeve 43 is removed, the ring gear 42 is also removed and the particular pinion 40 attached to or cooperating with an individual lens holder 30 is partly rotated.

The arrangement shown utilizes a form of reduction gearing whereby very minor movements of the lens holders may be effectively and controllably made.

By referring to Fig. 6 it will be seen that each lens holder 30 holds a lens indicated at 50 and also holds a light filter element 51. In the projection of motion pictures in color from three isomorphous images differing in color value, each of three lens holders 30 is provided with a different light filter 51, these light filters being so balanced as to create a virtually natural color effect upon the viewing screen when the three images are simultaneously projected thereon.

The numeral 52 applied to Fig. 6 indicates a portion of a septum which preferably extends from the lens holder 33 to the aperture plate of the projector, such septum means including both horizontal and vertical components so that light passing through a particular section of the aperture plate is restrained and only passes through its corresponding lens system 50. Thin shielding members 53 cover the edge portions of each lens system 50 and further act as septa limiting the individual light beams.

I claim:

1. In an apparatus of the character described, the combination of a lens housing, a plurality of lens systems adjustably positioned therein, each lens system including its optical axis, septa dividing said lens systems one from the other, said lens systems being adapted to focus upon separate rectangular image areas of an aperture, means for adjustably positioning a portion at least of said lens systems along planes extending through the optical axis of each lens system and the diagonal of a related image area, said means including a threaded, longitudinally movable shaft associated with each of said lens systems and having its axis parallel to the diagonal of a related image area, a rotatable pinion operably connected to each of said shafts, a ring gear in engagement with all of said pinions, and means for adjustably and partially rotating said ring gear.

2. In an apparatus of the character described, the combination of: a lens housing, a plurality of lens systems adjustably positioned therein, each lens system including its optical axis, septa dividing said lens system one from the other, said lens systems being adapted to focus upon separate rectangular image areas of an aperture, means for adjustably positioning a portion at least of said lens systems along planes extending through the optical axis of each lens system and the diagonal of a related image area, said means including a threaded longitudinally movable shaft associated with each of said lens systems and having its axis parallel to the diagonal of a related image area, a rotatable pinion operably connected to each of said shafts, means for restraining lateral motion of each of said pinions, a ring gear in engagement with all of said pinions, and means for adjustably and partially rotating said ring gear whereby the optical axes may be simultaneously moved toward and away from each other to accurately focus said lens systems upon a common object area.

3. In an apparatus of the character described, the combination of: a lens housing, a plurality of lens systems adjustably positioned therein, said lens systems being adapted to focus upon separate rectangular image areas of an aperture; means for adjustably positioning a part at least of said lens systems along radial planes, said means including a threaded, longitudinally movable shaft associated with each of said lens systems and having its axis along a radial plane, a rotatable pinion operably connected to each of said shafts, means for restraining lateral motion of each of said pinions, a ring gear in engagement with all of said pinions, and means for adjustably and partially rotating said ring gear whereby said lens systems may be simultaneously moved toward and away from each other to accurately focus said lens systems upon a common object area.

4. In an apparatus of the character described, the combination of: a lens housing, a plurality of lens systems adjustably positioned therein, each lens system including a lens holder provided with a lens carrying its optical axis and a light filter, said lens systems being adapted to focus upon separate rectangular image areas of an aperture, one end of each lens holder being pivotally connected to the lens housing on a pivot pin extending in a direction at right angles to the diagonal of a related image area, spring means for yieldably urging said lens systems toward each other, and a single means carried by the housing and operably connected to all of said lens holders for adjustably moving said lens systems toward and away from each other to accurately focus said lens systems upon a common object area.

5. In an apparatus of the character described, the combination of: a lens housing, a plurality of lens systems adjustably positioned therein, each lens system including a lens holder provided with a lens carrying its optical axis and a light filter, said lens systems being adapted to focus upon separate rectangular image areas of an aperture, one end of each lens holder being pivotally connected to the lens housing on a pivot pin extending in a direction at right angles to the diagonal of a related image area, spring means for yieldably urging said lens systems toward each other, and means for adjustably positioning a portion at least of said lens systems along planes extending through the optical axis of each lens system and the diagonal of a related image area, said means including a threaded, longitudinally movable shaft associated with each of said lens systems and having its axis parallel to the diagonal of a related image area, a rotatable pinion operably connected to each of said shafts, means for restraining lateral motion of each of said pinions, a ring gear in engagement with all of said pinions, and means for rotating said ring gear whereby the optical axes may be simultaneously moved toward and away from each other to accurately focus said lens system upon a common object area.

RICHARD THOMAS.